United States Patent [19]
Hickok et al.

[11] Patent Number: 5,779,885
[45] Date of Patent: *Jul. 14, 1998

[54] ROTATING BIOLOGICAL FILTER SYSTEM

[75] Inventors: Roy S. Hickok, Moorpark; Roger W. McGrath, Simi Valley, both of Calif.

[73] Assignee: Aquaria, Inc., MoorPark, Calif.

[*] Notice: The term of this patent shall not extend beyond the expiration date of Pat. No. 5,419,831.

[21] Appl. No.: 367,843

[22] Filed: Dec. 30, 1994

Related U.S. Application Data

[63] Continuation-in-part of Ser. No. 4,677, Jan. 14, 1993, Pat. No. 5,419,831, which is a continuation of Ser. No. 708,478, May 31, 1991, abandoned, which is a continuation-in-part of Ser. No. 535,905, Jun. 11, 1990, abandoned, and a continuation-in-part of Ser. No. 125,445, Sep. 22, 1993, abandoned.

[51] Int. Cl.$^6$ ............................................. C02F 3/08
[52] U.S. Cl. ........................................ 210/150; 210/169
[58] Field of Search ............................ 210/150, 151, 210/169, 416.2

[56] References Cited

U.S. PATENT DOCUMENTS

| | | | |
|---|---|---|---|
| 1,811,181 | 6/1931 | Maltby | 210/150 |
| 2,696,800 | 12/1954 | Rork | 119/5 |
| 2,877,051 | 3/1959 | Cushman et al. | 299/3 |
| 3,723,304 | 3/1973 | Storck | 210/151 |
| 3,849,304 | 11/1974 | Torpey et al. | 210/151 |
| 3,869,380 | 3/1975 | Torpey | 210/619 |
| 3,957,634 | 5/1976 | Orensten et al. | 210/164 |
| 4,157,303 | 6/1979 | Yoshikawa et la. | 210/150 |
| 4,160,736 | 7/1979 | Prosser | 210/150 |
| 4,267,051 | 5/1981 | Uhlmann | 210/150 |
| 4,268,385 | 5/1981 | Yoshikawa | 210/150 |
| 4,282,095 | 8/1981 | Tsuhako | 210/169 |
| 4,284,503 | 8/1981 | Stahler | 210/150 |
| 4,364,826 | 12/1982 | Kato | 210/150 |
| 4,622,148 | 11/1986 | Willinger | 210/150 |
| 4,737,278 | 4/1988 | Miller | 210/150 |
| 5,078,867 | 1/1992 | Danner | 210/169 |
| 5,160,622 | 11/1992 | Gunderson et al. | 210/169 |
| 5,228,986 | 7/1993 | Ellis et al. | 210/169 |

FOREIGN PATENT DOCUMENTS

| | | |
|---|---|---|
| 57-1489 | 1/1982 | Japan . |
| 62-97694 | 5/1987 | Japan . |
| WO8504306 | 10/1985 | WIPO . |
| WO8605770 | 10/1986 | WIPO . |
| WO9119680 | 12/1991 | WIPO . |
| WO9221620 | 12/1992 | WIPO . |

OTHER PUBLICATIONS

"Filtration Techniques for Small–Scale Aquaculture in a Closed System" by Steven D. Van Gorder et al. (Dated prior to filing date of present application).

"Biodisc Waterwheel: A Design Alternative and its Application for an Air–Driven Fish Culture System" by Douglas J. Strange et al. (1985).

Marineland Wet/Dry Biological Filter Models Pro 30/Pro 60, Aquaria, Inc., Jan., 1993.

Marineland Commercial Aquariums Model #LB–12BW, dated prior to filing date of present application but after Mar. 1994.

*Primary Examiner*—Thomas G. Wyse
*Attorney, Agent, or Firm*—Loeb & Loeb LLP

[57] ABSTRACT

An aquatic filter system having a rotatably mounted cylindrical filter body. The cylindrical filter body is formed by a water absorbing mass of material. Water applied to one side of the filter body unbalances the filter body which causes the filter body to rotate. As a result of the rotational movement, at least a portion of the filter body is alternately exposed to the water and the atmosphere to foster the growth of aerobic bacteria on the surfaces of the filter body.

24 Claims, 11 Drawing Sheets

ROTATING BIOLOGICAL FILTER SYSTEM

CROSS-REFERENCE TO RELATED APPLICATIONS

This is a continuation-in-part of application Ser. No. 08/004,677, filed Jan. 14, 1993, now U.S. Pat. No. 5,419,831, which is a continuation of application Ser. No. 07/708,478, filed May 31, 1991, now abandoned, which is itself a continuation-in-part of application Ser. No. 07/535,905, now abandoned, filed Jun. 11, 1990, the disclosure of which is incorporated herein by reference, and application Ser. No. 08/125,445, now abandoned, filed Sep. 22, 1993, the entire disclosure of which is presented herein.

BACKGROUND OF THE INVENTION

1. Field of the Invention

The present invention relates to aquatic filter systems, and more particularly, to aquatic filter systems having biological filter elements. More specifically, the invention is directed to further improvements in filter systems employing a rotary filter element composed at least in part of a body of porous material.

2. Description of Related Art

Under ideal conditions, aquatic systems including aquariums, fish ponds, and commercial fish and lobster holding tanks, will act as substantially self-contained ecosystems. That is, except for the need of the aquatic system operator to provide food to the fish within the system, the ideal aquatic system should maintain itself as an environment suitable to sustain and foster the healthy growth of the aquatic life which it contains. However, the aquatic life within the system will typically release wastes and other byproducts into the system water. In time, the buildup of undesirable wastes and pollutants can reach toxic levels and eventually poison the aquatic life within the system. As a result, it is necessary for an aquatic system to include a system for filtering and purifying the system water to eliminate undesirable wastes and toxins and to maintain a healthy environment.

Typical aquatic filters rely on mechanical filtration to remove detritus from the system water. Such a mechanical filter can be one of several types. For example, in under gravel type filtration systems for aquariums, a pump circulates the aquarium water through a bed of gravel supported on a suitable structure. The gravel bed, which is typically located within the aquarium, traps and removes solid wastes and detritus from the water as it flows through the bed. In other mechanical filtration systems, a pump removes aquarium water from the aquarium and circulates the water through a filter element and back into the aquarium. Like the gravel bed, the filter element traps and removes harmful detritus from the circulating aquarium water.

In addition to mechanical filtration, chemical filtration can be used to maintain a life-supporting environment within an aquatic system. Chemical filtration systems typically circulate the system water through a chemical filter element, such as activated carbon. This type of filtration is helpful in removing dissolved organic compounds and carbon dioxide and can help to maintain a stable pH within the aquatic system.

However, neither mechanical nor chemical filtration techniques are typically effective in removing such waste byproducts as ammonia, nitrites, or nitrates. Some of these nitrogen based contaminants, particularly ammonia, can be extremely harmful to the types of aquatic life typically found in aquatic systems. An effective method of removing such contaminants is biological filtration. Biological filtration relies on the presence of aerobic bacteria to convert some water born toxic wastes, particularly ammonia, to nontoxic or less toxic substances. It is possible for aerobic bacteria to grow, to a limited extent, on mechanical filter elements. Thus there may be some biological filtration along with the mechanical filtration described above.

However, typically, the aerobic bacteria which grows on the mechanical filter elements, or the under gravel bed, must rely on the dissolved oxygen present in the water for its growth. As a result of the limited availability of oxygen, coupled with reduced water flow as the filter becomes plugged, the amount of aerobic bacteria, and hence the degree of biological filtration, associated with mechanical filter elements or under gravel beds is inherently limited. Further, as mechanical filter elements become plugged with detritus, they must be replaced in order to maintain water flow. Each time a filter element is replaced, any aerobic bacteria which may have colonized the filter element are removed from the system and the colonization must restart on the new filter element. During the recolonization period, the environmental balance within the system may be jeopardized by the absence of sufficient amounts of aerobic bacteria.

Trickle filters have been devised as one method of fostering the growth of aerobic bacteria and increasing the efficiency of the biological filtration process. In trickle filters, water is typically removed from the aquarium, tanks or pond and allowed to trickle over a bed of lava rock, plastic balls, or the like. Because the filter bed is not submerged, there is more oxygen available for the growth of aerobic bacteria. However, trickle filters can take up a relatively large area and usually require dedicated plumbing and pump fixtures. As a result, such filters can be expensive and impractical in many applications in which a large amount of water is required to be treated.

Large scale waste water treatment facilities frequently use rotating biological contactors in an effort to promote the growth of aerobic bacteria. Rotating biological contactors typically include a number of partially submerged filter elements, frequently disc shaped, mounted along a central shaft. The central shaft is driven to rotate the elements such that at least a portion of each filter element is alternately submerged and exposed to the air. In this manner, the growth of aerobic bacteria on the surface of the filter elements is promoted by the intermittent exposure to the oxygen in the air and the biological filtration of the waste water is promoted by the intermittent submersion of the bacteria bearing surfaces. However, rotating biological contactors from waste water treatment facilities are usually not readily compatible for use with aquariums, fish holding tanks and ponds. In part, this is due to their large size, the need for a separate drive mechanism, the lack of an appropriate location for such a device within the aquarium, tank or pond, and the lowered efficiency in biological filtration when the size of the rotating biological contactors is reduced for use with aquatic systems.

Rotating biological filters which are intended primarily for use in home or office aquariums are described in copending application Ser. No. 08/004,678, filed Jan. 14, 1993, entitled "Rotating Biologic Aquarium Filter System" (which is a continuation of application Ser. No. 07/535,905, filed Jun. 11, 1990) and application Ser. No. 08/004,677, filed Jan. 14, 1993, entitled "Rotating Biological Aquarium Filter System" (which is a continuation of application Ser. No. 07/708,478, filed May 31, 1991 which in turn is a continuation-in-part application of application Ser. No. 07/535,905, filed Jun. 11, 1990), the subject matter of these applications being hereby incorporated by reference in their entireties. However, these aquarium filters are not readily adapted to use in large commercial holding tanks and outdoor fish ponds.

SUMMARY OF THE INVENTION

It is an object of the present invention to provide a filter system for aquatic systems which effectively reduces the quantity of toxic substances, particularly ammonia, in the system water.

It is still another object of the present invention to provide an aquatic filter system which is reliable and easily manufactured.

It is yet another object of the present invention to provide an aquatic filter system which is compact, easy to install, and simple to use.

An aquatic filter system for a pond, aquarium or commercial fish or lobster holding tank in accordance with one embodiment of the present invention comprises a rotatably mounted filter body comprising a porous mass. The filter body is positioned to receive a flow of water so that water is absorbed by the filter body mass primarily on one side of the mass. As a consequence, the filter body is unbalanced by the additional absorbed water such that rotational movement is imparted to the filter body by the additional weight of the water absorbed on one side of the body. As the filter body rotates, at least a portion of the filter body is alternately exposed to the water and the atmosphere.

The aquatic filter system in accordance with another aspect of the invention has a control system for changing the immersion depth of the filter body in the water to thereby change the rotational speed of the filter body and the surface areas of the filter body to be exposed to the water and to the atmosphere.

In an aquatic filter system in accordance with the present invention, water which is to be delivered to the rotatably mounted filter body so as to be absorbed by, and unbalanced, the filter body, can be delivered so as to initially contact the body at any vertical level between the upper extremity and the lower extremity of the body surface. In addition, the rotatably mounted filter body can be partly submerged in standing or flowing water to virtually any depth, or the entire rotatably mounted filter body can be above the surface of, i.e. out of contact with, a mass of standing or flowing water underlying the body.

Other objects and aspects of the invention will become apparent to those skilled in the art from the detailed description of the invention which is presented by way of example and not as a limitation of the present invention.

DESCRIPTION OF THE ILLUSTRATED EMBODIMENT

Figure 1:
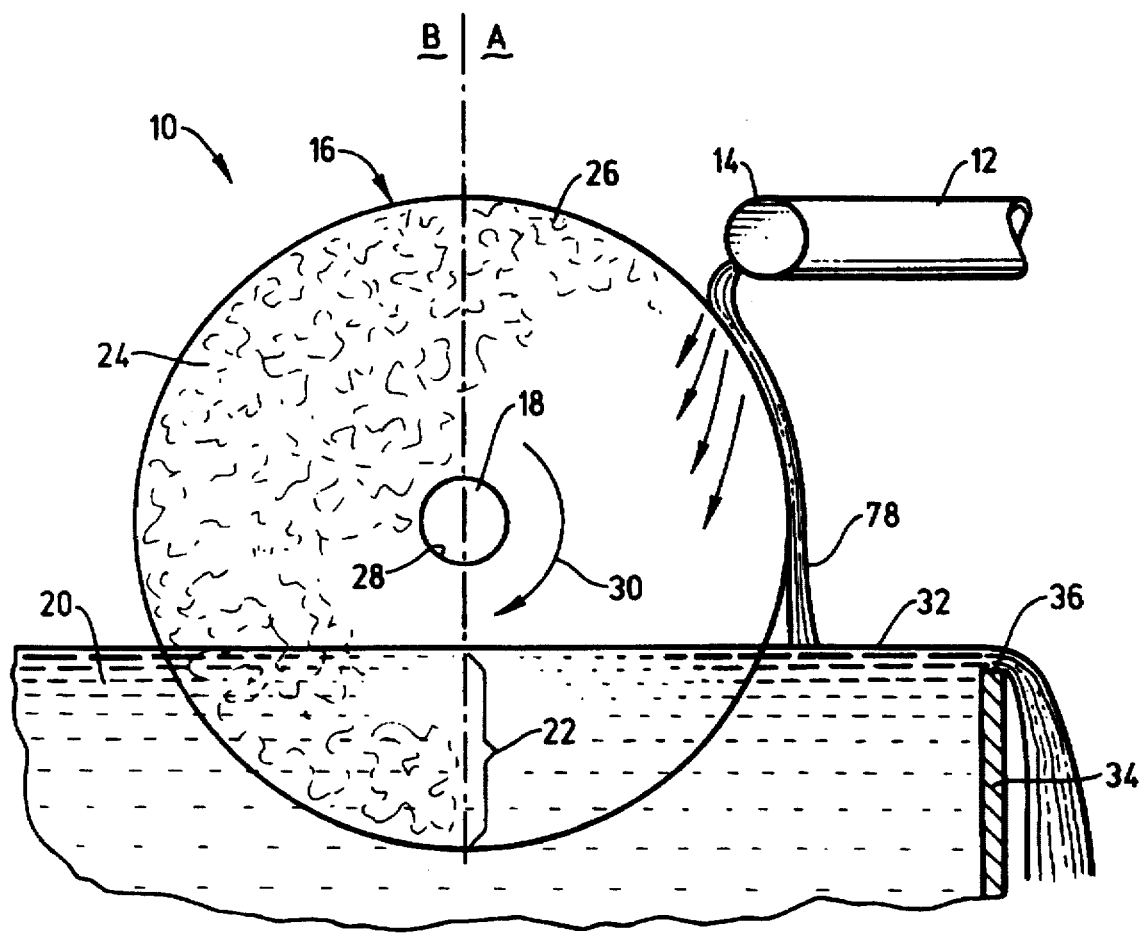
FIG. 1 is a schematic side view of a rotary filter system in accordance with a preferred embodiment of the present invention with a cross-sectional view of a rotary filter element.

An aquatic filter system in accordance with a preferred embodiment of the present invention is indicated in FIG. 1 as reference numeral 10. In the illustrated filter system 10, water is drawn from an aquarium, holding tank or fish pond (not shown) through an intake tube 12 by a pump or other appropriate devices (not shown). The water flows through a spray bar 14 and is poured onto a rotary filter element 16. The rotary filter element 16 is rotatably mounted about a shaft 18 and partially submerged in standing water 20 by a predetermined depth 22.

The rotary filter element 16 includes filter media which are preferably provided by a porous, water absorptive mass of material 24 formed into a one-piece body 26. In the illustrated embodiment, the body 26 has the shape of a cylinder which defines a central through-hole 28 to receive the shaft 18 about which the cylinder 26 rotates. Alternatively, the filter media of the cylinder 26 may be formed by a plurality of water-absorptive disks, each having a central aperture. The plurality of disks are stacked to each other to form a cylindrical shape. Although the body 26 is illustrated as a cylinder, the filter media body may have a variety of other shapes as well.

Figure 2:
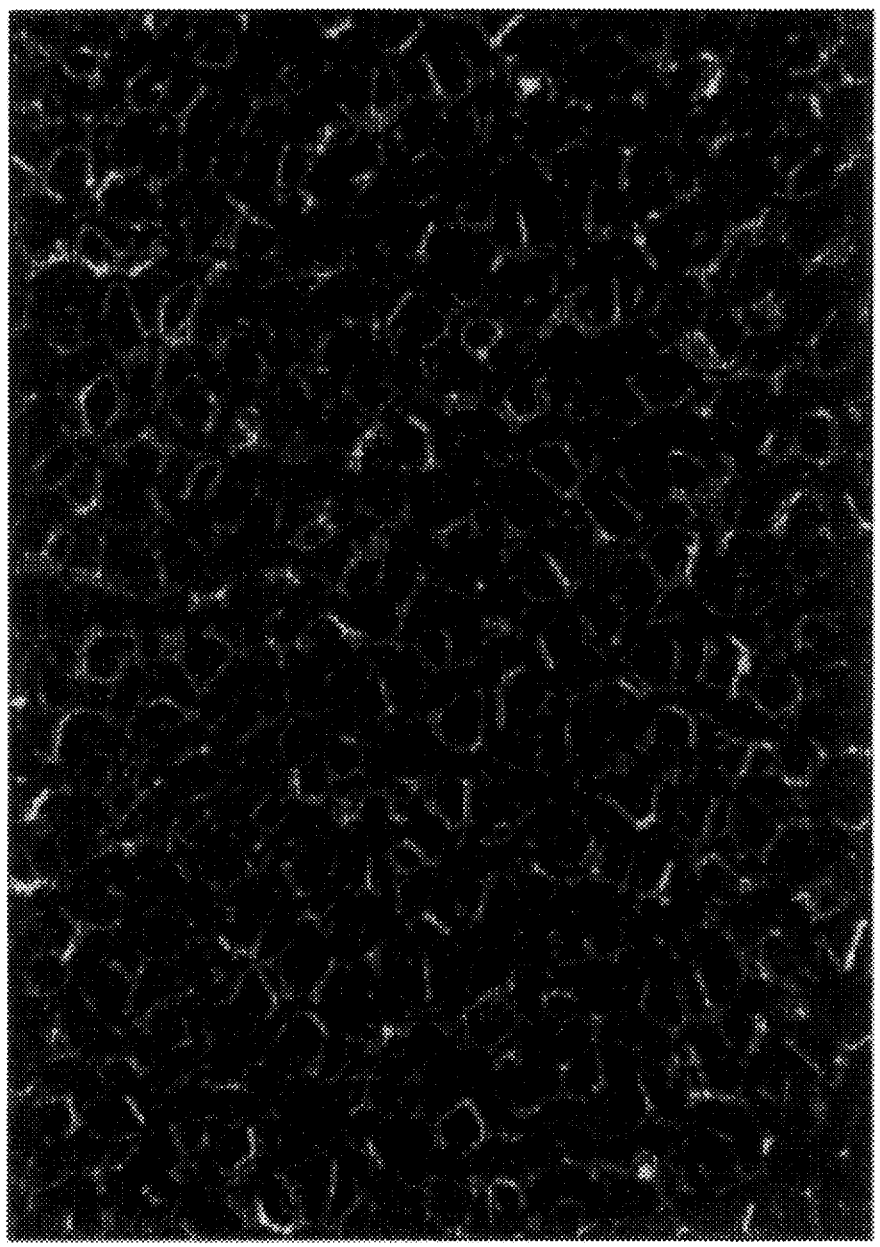
FIG. 2 is an enlarged photo of a cross-section of a porous mass of a reticulated ether-based polyurethane cellular foam material used for the filter media of the rotary filter element in the system shown in FIG. 1.
Figure 3:
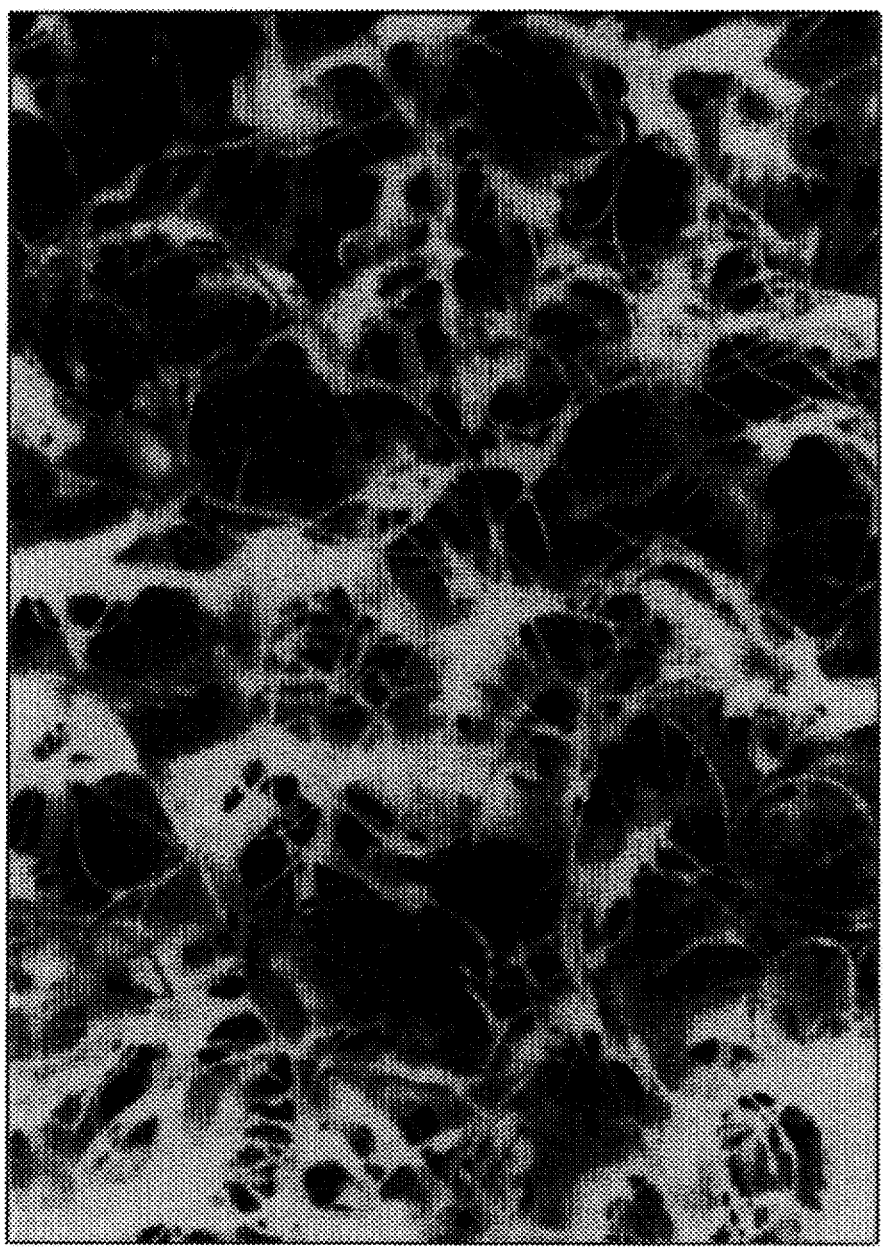
FIG. 3 is an enlarged photo of a cross-section of a porous mass of fibrous material sold under the trade name "Aquacell Plus" by Hobbs Industries, which is alternatively used as a material for the filter media for the rotary filter element in the system shown in FIG. 1.

Any one of several appropriate water-absorptive or porous bodies of materials may be used to form the media cylinder 26. However, to maximize the surface areas of the filter media which are available for the growth of aerobic bacteria, and to facilitate quick absorption and drainage of water, the rotary media cylinder 26 is preferably formed by a porous, reticulated cellular sponge-like material which comprises a mass of numerous broken cells interconnected by strands. For example, one such porous body of material is a reticulated ether-based polyurethane foam (see photo of FIG. 2) having a porosity of 10–60 pores per inch. In another preferred embodiment of the present invention, the media cylinder 26 of the rotary filter element 16 may be formed by a porous, reticulated, fibrous material sold under the trade name "Aquacell Plus" (see photo of FIG. 3) by Hobbs Industries. The Aquacell Plus material comprises a mass of numerous fibers and a resin which bridges between the fibers to define numerous irregular sized broken cells. It has been recognized that water readily permeates through pores of the reticulated mass such that the porous body of material can relatively promptly absorb and then subsequently drain water.

Referring back to FIG. 1, the water from the bar 14 is generally applied to one side only, for example, side A of the surface of the filter element 16 so that the applied water is absorbed primarily by one side only (side A) of the media cylinder 26. As a result, the applied water adds additional weight on side A of the filter element 16 which unbalances the filter element about the shaft 18, causing the filter element 16 to rotate about the shaft 18 in the direction of the arrow 30. To unbalance the filter element 16 about the shaft 18, the system water may be sprayed or otherwise applied along the entire length or only at a limited area along the length of the cylindrical filter wheel element 16. Aquatic system water absorbed by the filter element 16 subsequently drains from the porous mass of material on side B of the filter media cylinder 26 as each portion of the filter media cylinder rotates upwardly in turn out of the standing water 20. Therefore, as long is water is applied to side A of the media cylinder of filter element 16, the porous mass of side A will contain more absorbed water than side B of the porous mass. As a consequence, side A will apply a greater moment arm on the shaft 18 as compared to the moment arm applied by side B. In other words, the sides A and B will be unbalanced, causing the filter element 16 to rotate as long as water is applied to side A of the filter element.

It is believed that the rotational force applied to the filter element 16 is primarily that provided by the net difference in weight of the water absorbed by the two sides of the absorptive mass of the filter media cylinder, rather than any impulse force provided by water striking the filter element from the spray bar 14. As a consequence, water can be applied to one side of the filter element 16 from any direction, including a direction which opposes the rotation of the filter element.

As the filter element 16 rotates each portion of the filter media cylinder 26 in turn is alternately exposed to the system water and the air which fosters the growth of aerobic bacteria on the surfaces of the porous mass of the filter media cylinder 26 and brings the aerobic bacteria into contact with the water being treated. In this manner, the aerobic bacteria on the surfaces of the filter media cylinder 26 can remove toxins, including ammonia and nitrites, from the treated water. Since the filter media cylinder 26 is formed by a water-absorptive, porous mass of material, the combined internal and external surface areas of the filter media cylinder 26 provide an extremely large effective surface area in contact with system water, which is much larger than the external surface of a non-porous filter element. As a result, the efficiency of the biological filtration is substantially improved.

It is believed that the cylindrical filter element 16 should preferably rotate at a rotation speed of approximately 0.5 to 10 R.P.M., more preferably at approximately 1 to 5 R.P.M. to provide an optimum biological filtration efficiency. In one aspect of the present invention, the rotation speed of the filter element 16 is determined by the submersion depth 22, rate of the water flow from the spray bar 14 and the distance from the centerline of filter element 16 to where the water flow is deposited on filter element 16. Thus, in some applications it may be desirable to vary one or more of the submersion depth, the position the water is deposited on the filter element or the water flow rate in order to make the device rotational speed easy to adjust under a variety of operating conditions. In a preferred embodiment of the present invention, the submersion depth 22 of the cylindrical filter wheel element 16 is selected to be approximately 20–40% of the diameter of the media cylinder 26, more preferably approximately 30–40% of the diameter of the cylinder 26 to achieve the above mentioned rotation speed.

The submersion depth 22 may be changed by any one of various methods. For example, the position of the shaft 18 may be changed with respect to the water level 32 to change the submersion depth 22. Alternatively, the water level 32 may be changed to change the submersion depth 22. In a preferred embodiment of the present invention, as described later in greater detail, the water level is adjusted by a weir 34. The weir 34 may be raised or lowered so that the level of water flowing out over the weir 34 may be changed.

Figure 4:
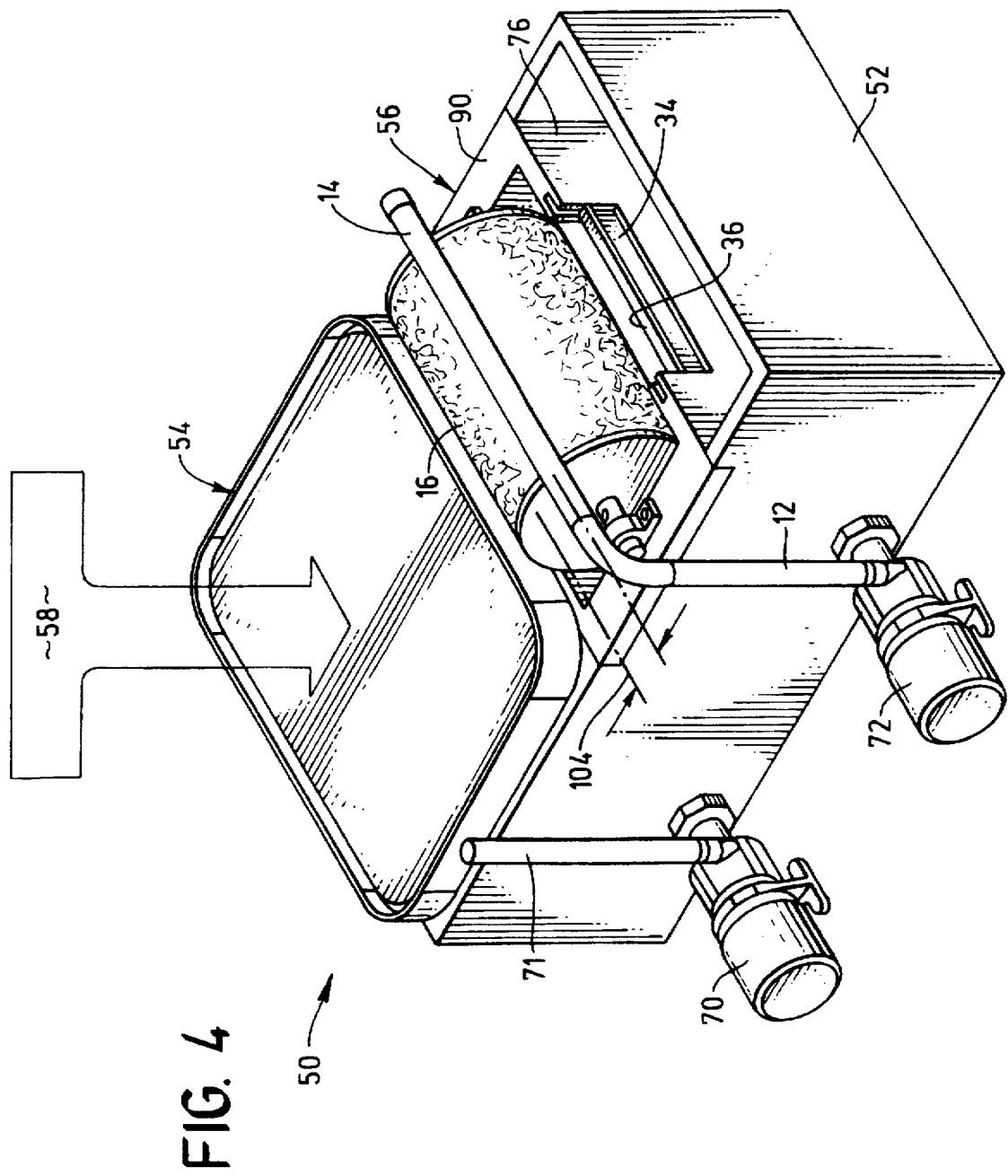
FIG. 4 is a perspective view of a rotary filter system in accordance with a preferred embodiment of the present invention.
Figure 5:
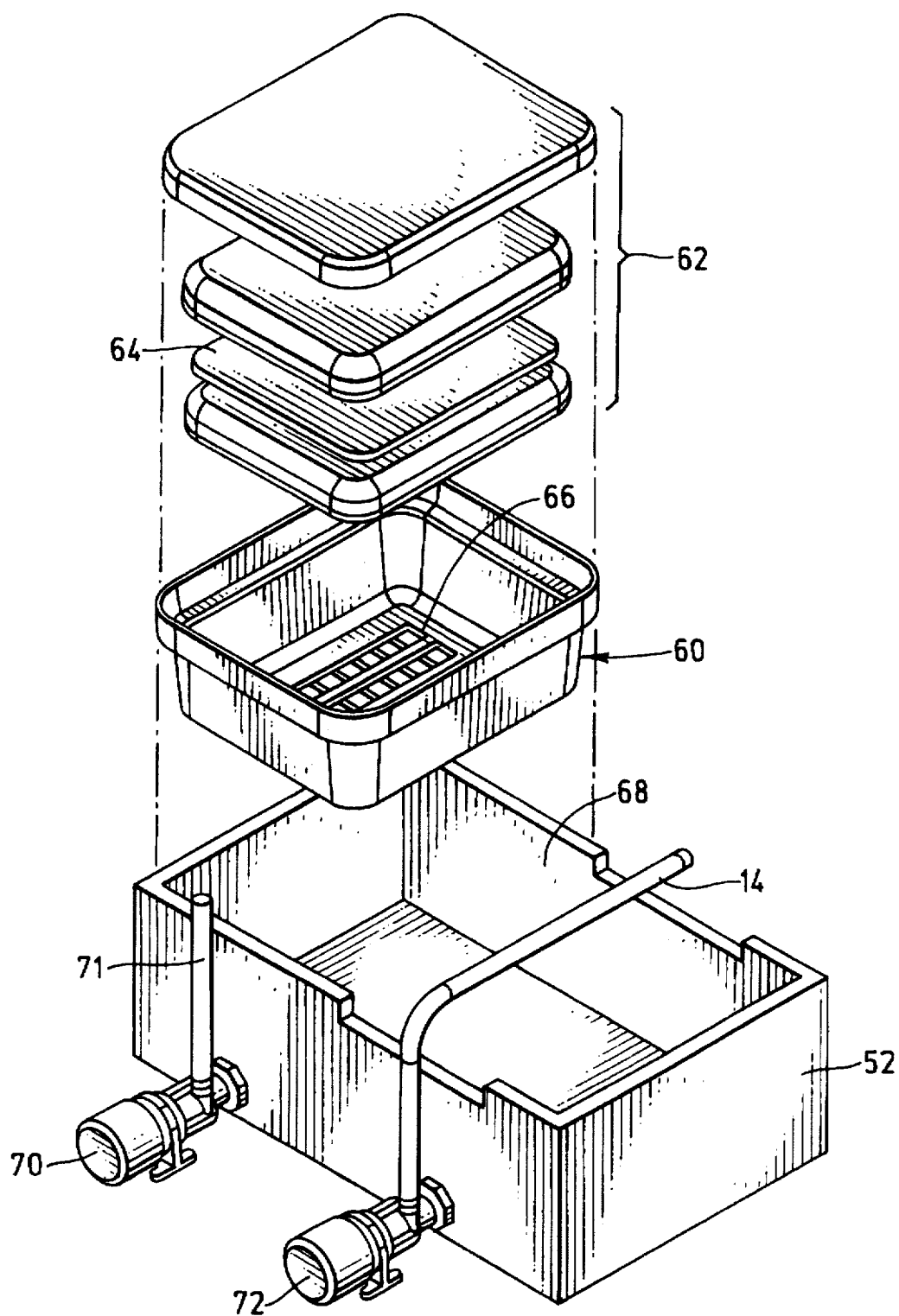
FIG. 5 is an exploded view of a pre-filtration assembly and a housing assembly of the filter system of FIG. 4.
Figure 6:
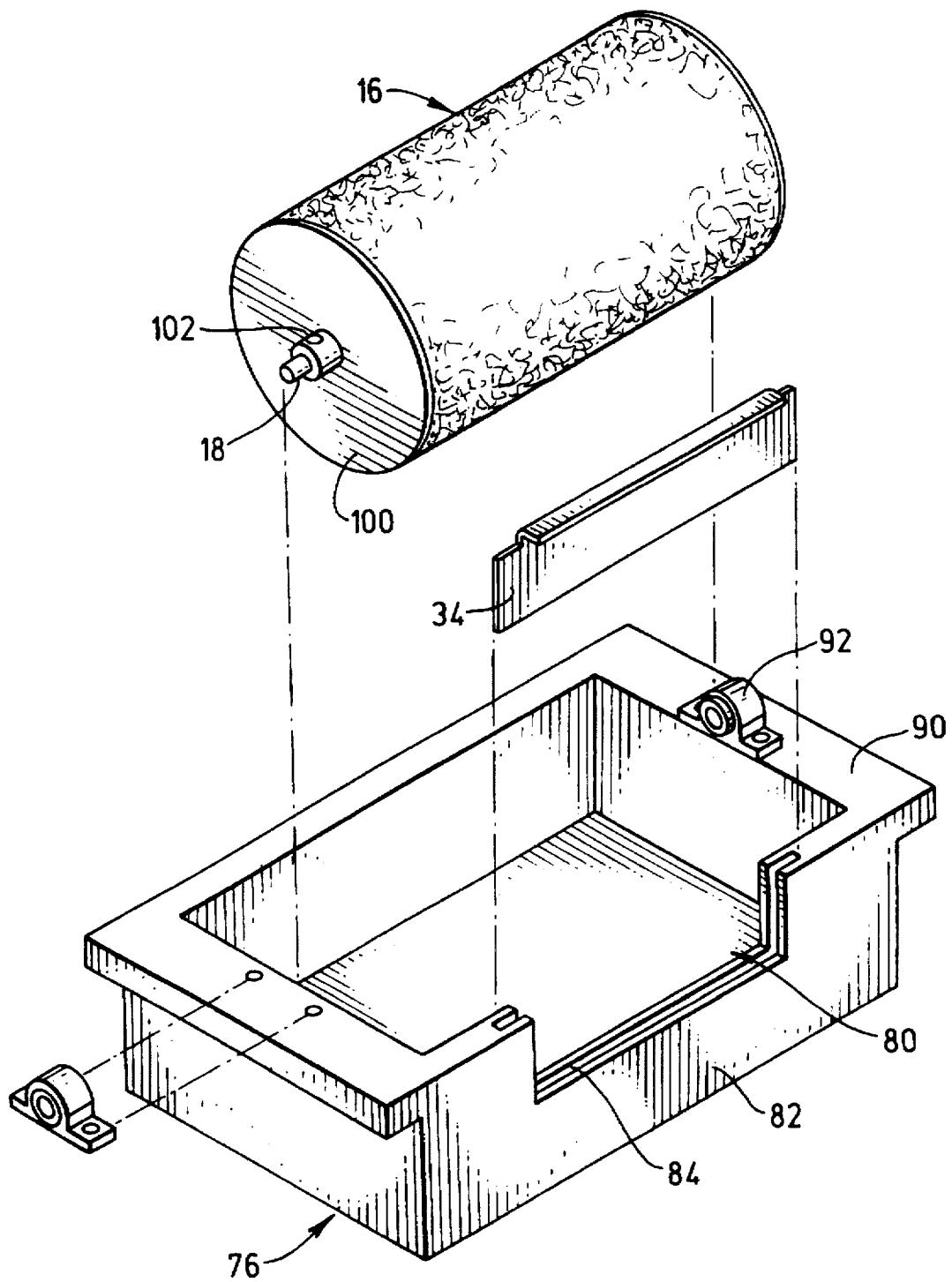
FIG. 6 is an exploded view of a rotary filter wheel assembly of the filter system of FIG. 4.

FIGS. 4–6 show a biological aquatic filtration system 50 in accordance with an alternative embodiment of the present invention. As best seen in FIG. 4, the biological aquatic filtration system 50 includes a sump housing 52 which contains a pre-filtration assembly 54 and a biological wheel filtering assembly 56. Water is drawn from the aquarium, tank, reservoir or pond 58 by a pump (not shown) or other appropriate devices. The water flows into the sump housing 52 through the pre-filtration assembly 54, and then is pumped to the biological wheel filtering assembly 56.

As best shown in FIG. 5, the pre-filtration assembly 54 includes a filter box 60 which is dimensioned to fit inside the sump housing 52. The filter box 60 contains therein a plurality of filter pads with activated carbon placed therein. In one embodiment of the present invention, filter pads 62 are provided in the filter box 60 together with one or more of a variety of filtering chemicals such as a layer of activated carbon 64. The filter box 60 may be provided with a plurality of openings 66 adjacent the bottom thereof to allow the water filtered through the filter pads 62 and the activated carbon 64 to flow out of the filter box 60 into a sump 68 of the sump housing 52. As a result, the system water entering the sump 68 is mechanically and chemically filtered.

A first pump 70 is adapted to draw the filtered water out of the sump 68 and to return the filtered water through a return tube 71 to the tank 58. A second pump 72 is adapted to draw the filtered water out of the sump 68 and to pump the filtered water into the spray tube 14 which is positioned over the biological wheel filtering assembly 56. The flow rate from the tube 14 may be controlled by means of a valve (not shown) or controlling the speed of the pump 72.

As best shown in FIGS. 4 and 6, the biological wheel filtering assembly 56 includes a rotary filter tray 76 and the rotary filter element 16 which is rotatably mounted to the shelves 90 of the rotary filter tray 76 by bearing housings 92. The rotary filter tray 76 has an opening 80 provided in one side wall 82 of the rotary filter tray 76. Grooves 84 are formed in the wall 82 along the opening 80 for receiving therein a weir 34. The height 36 of the weir 34 is adjusted by sliding the weir 34 within the grooves 84. When the rotary filter tray 76 is filled with water, the water flows out of the rotary filter tray 76 over the weir 34. Thus the adjustable height 36 of the weir 34 determines the level of water in the rotary filter tray 76. In an alternative embodiment, weirs having a variety of different heights may be used to adjust the level of water in the rotary filter tray 76.

Figure 7:
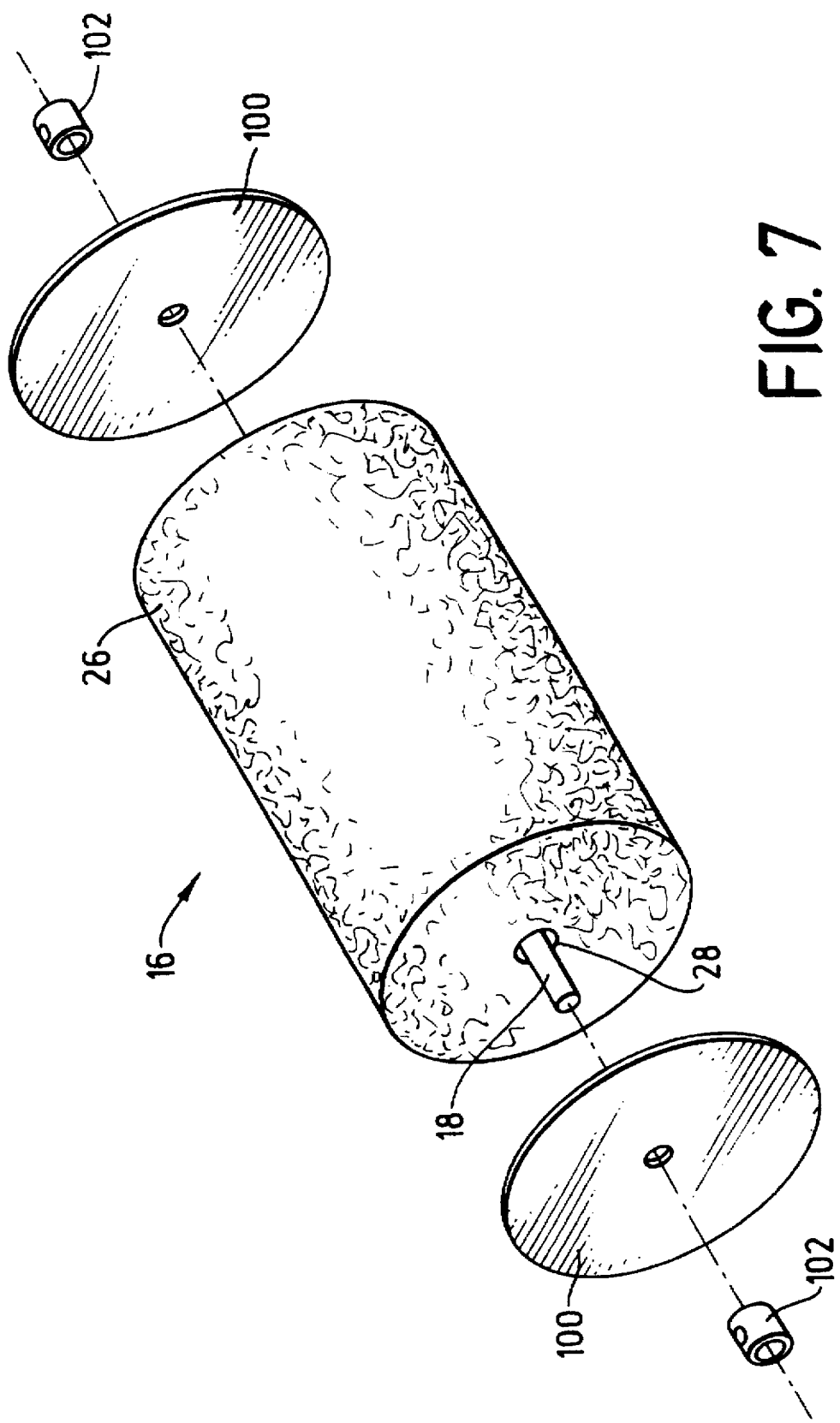
FIG. 7 is an exploded view of the rotary filter element of the filter system of FIG. 4.

As shown in FIG. 7, the rotary filter element 16 includes the one-piece cylinder 26 formed of a unitary porous mass of material. The cylinder 26 is provided with an aperture 28 for receiving a central shaft 18. However, in other embodiments, it may be desirable to provide a stub shaft on each of the end plates 100 rather than a single central shaft 18 extending through the entire filter element 16.

In an alternative embodiment, the rotary filter element 16 may be formed by a plurality of disks (not shown), each formed of a unitary porous mass of material and having a central aperture. The disks can be stacked to each other to form a cylindrical shape. The cylinder 26 may be lightly compressed between a pair of end plates 100 so that the cylinder 26 and the central shaft 18 rotate together. The end plates 100 are mounted on the central shaft 18 by hubs 102 fastened by appropriate devices such as screws to both ends of the central shaft 18. In alternative embodiments, the cylinder 26 may be coupled to the central shaft 18 by means of an adhesive, a friction fit, or any other suitable manner which will be apparent to those skilled in the art.

As previously mentioned, the rotary filter element 16 is preferably formed by a reticulated ether-based polyurethane foam with a porosity of 10–60 pores per inch. Alternatively, the rotary filter element 16 may be formed by a reticulated, fibrous material such as the material sold under the trade name "Aquacell Plus" by Hobbs Industries. The reticulated ether-based polyurethane foam and fibrous mass have a very large effective surface area and readily absorb and drain water to promote the growth of beneficial bacteria. However, it should be understood that there are a variety of other materials which can be formed into a body or mass which relatively promptly absorbs and drains water. Accordingly, the scope of the present invention should not be limited by those materials expressly described herein.

In the illustrated embodiment as shown in FIG. 4, the spray bar 14 is positioned so that filtered water from the spray bar 14 is deposited only on one side of the media cylinder 26 with respect to a center 104 of the cylinder 26 (on the right hand side of the wheel element when viewed from the side at which the pumps 70 and 72 are provided, as illustrated in FIG. 4). It is appreciated that most, if not all, of the applied water is absorbed by the media cylinder 26 due to its absorptive nature and is absorbed primarily at the right side of the cylinder 26. As a result, the absorbed water adds weight on the right side of the cylinder 26 and unbalances the cylinder 26, causing the filter element 16 to rotate about the shaft 18. Depending upon the flow rate of the applied water and the absorptive capacity of the cylinder 26, some water may not be fully absorbed by the cylinder but may instead run over the surface of the cylinder as depicted at 78 in FIG. 1.

The spray bar 14 may have a plurality of apertures (not shown) provided along substantially the entire length thereof to deposit water along substantially the entire length of the media cylinder 26 to unbalance the filter element 16 about the shaft 18. In an alternative embodiment, the spray bar 14 may have a fewer number of apertures so that the water may be sprayed only in a limited area along the length of the media cylinder 26. The portion of the cylinder 26 (relative to its centerline) upon which the water is applied may be controlled by displacing the spray tube either linearly or rotationally as appropriate to achieve the desired cylinder rotational speed.

In yet another alternative embodiment, the prefiltration assembly 54 may be positioned above the filter element 16 with the openings 66 or other suitable openings of the filter box 60 being directed toward the filter element 16 so that water exiting from the prefiltration assembly 54 is deposited directly onto the desired portion of the rotating filter element 16. As a consequence, the pump 72 and spray bar 14 can be eliminated.

As the water is sprayed over the media cylinder 26, causing the filter element 16 to rotate, each portion in turn of the media cylinder 26 is alternately exposed to the system water 20 and the air to foster the growth of aerobic bacteria on the internal and external surfaces of the cylinder 26. The rotation also brings the aerobic bacteria into contact with the system water to treat the water. The biologically filtered water passes over the weir 34 to the sump tank 52 where it is returned by the pump 70 to the tank or pond. Since the media cylinder 26 is formed by a porous water-absorptive mass of material, the total surface areas of the filter element 16 which are in contact with the system water are substantially large as compared with the external surface of a non-porous filter element of similar size. As a result, the efficiency in the biological filtration is substantially improved.

Figure 8:
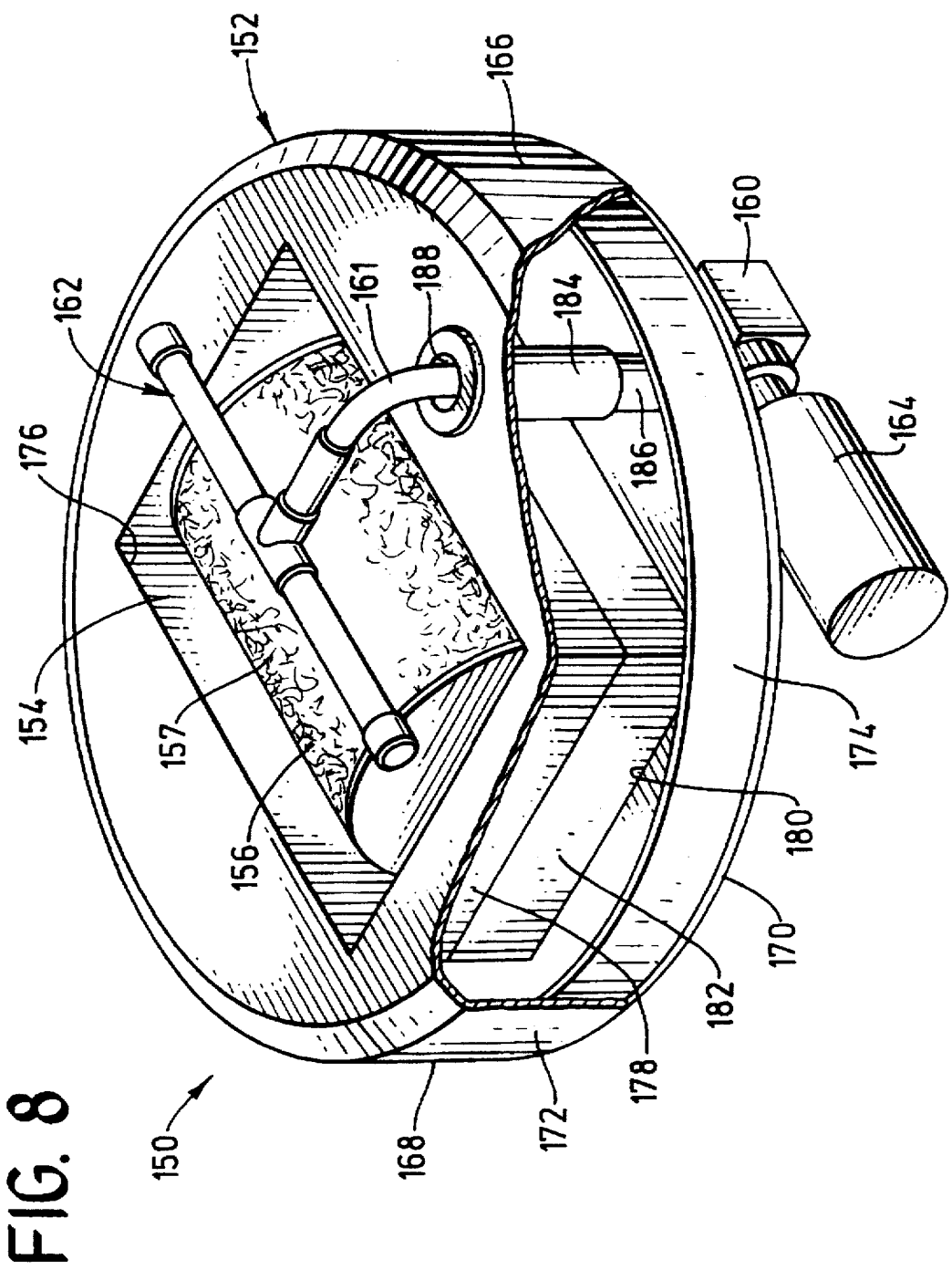
FIG. 8 is a partially broken perspective view of a biological rotary filter system in accordance with an alternative embodiment of the present invention.
Figure 9:
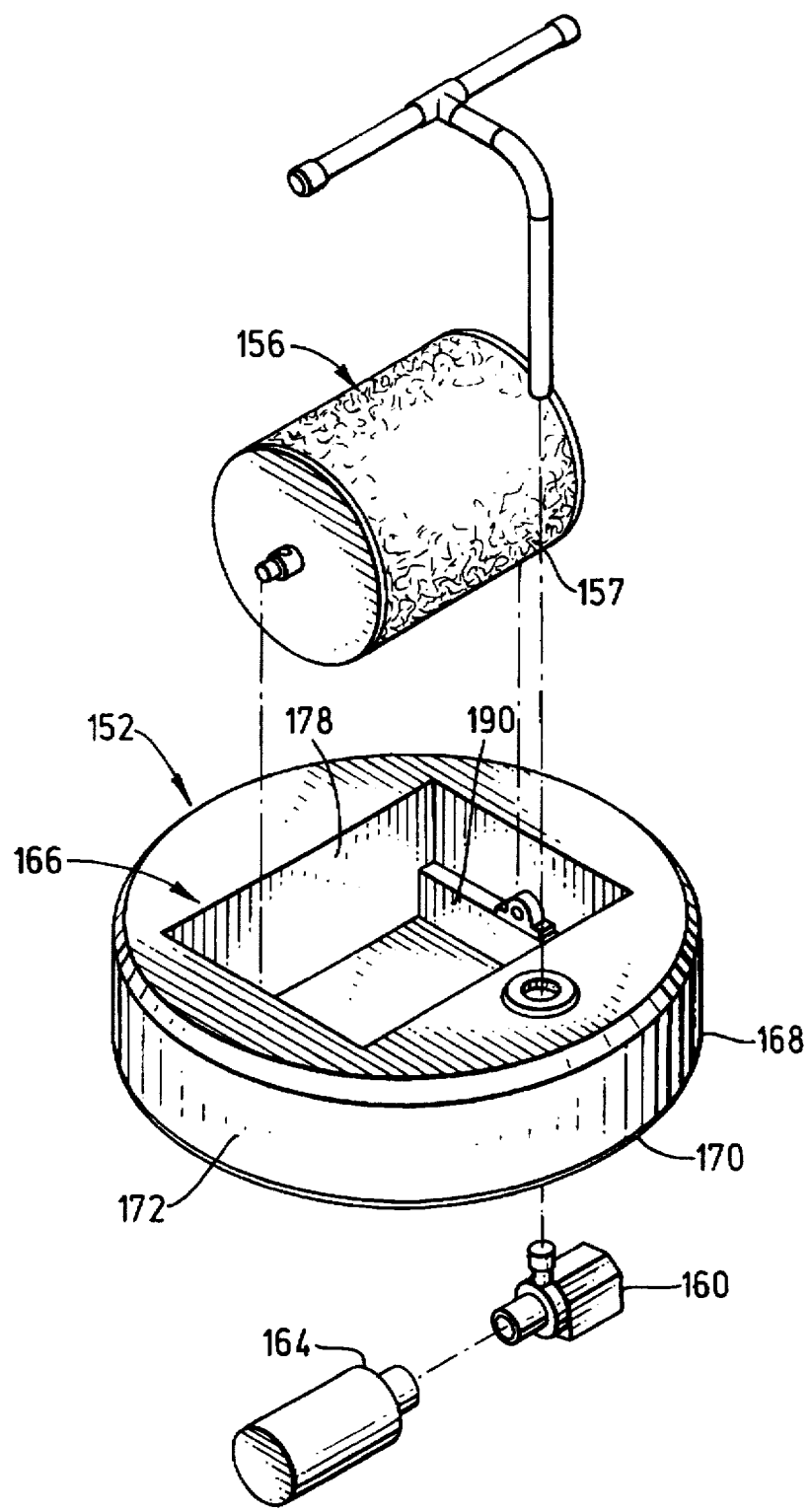
FIG. 9 is an exploded perspective view of the biological rotary filter system of FIG. 8.

FIGS. 8 and 9 show a biological aquatic filtration system 150 in accordance with an alternative embodiment of the present invention. In this embodiment, the biological filtration system 150 is provided with a floating device 152 so that the biological filtration system 150 can float in a pond, a water reservoir, or other body of water and directly biologically treat the water in which it is floating.

The floating device 152 defines a central opening 154 therein for receiving a rotary filter element 156 comprising a porous filter media cylinder 157. A submersible pump 160 is provided at the bottom of the floating device 152 to pump water in which the device 152 is floating to a spray bar 162 which is positioned over the rotary filter element 156. In the illustrated embodiment, the spray bar 162 is coupled to the submersible pump 160 through a connector tube 161 which extends through the floating device 152. A strainer 164 may be coupled to the submersible pump 160 for the mechanical and chemical filtration of the water. The submersible pump 160 may be operated by any one of appropriate power sources including, for example, solar cells, batteries and suitably sealed power lines.

In the illustrated embodiment as best shown in FIG. 8, the floating device 152 comprises a generally cylindrical float housing 166. The float housing 166 includes an upper section 168 and a lower section 170 which sealingly couples to the upper section 168. Preferably, the upper and lower sections 168 and 170 may be both made of any one of water impermeable materials, such as plastic and glass fiber. In other preferred embodiments, the float housing 166 may have a ventilated cover (not shown) which would completely enclose the rotary filter element 156 and the spray bar 162. Furthermore, the floating device 152 may include an anchoring device (not shown).

The upper section 168 has a circumferential side wall 172 which generally sealingly engages with a circumferential side wall 174 of the lower section 170. In other preferred embodiments, a seal ring (not shown) may be provided between the circumferential side walls 172 and 174 to provide watertight sealing, and the upper section 168 and the lower section 170 may be coupled and fastened to each other by means of a screw, a snap fit, an adhesive, or any other suitable manner apparent to those skilled in the art.

The upper section 168 also has a generally rectangular top opening 176 and downwardly extending internal upper walls 178 along the top opening 176. The lower section 170 has a generally rectangular bottom opening 180 and upwardly extending internal lower walls 182 along the bottom opening 180. The internal upper walls 178 and the internal lower walls 182 generally sealingly couple to each other to define the opening 154 of the floating device 152. In the illustrated embodiment, the upper section 168 has a downwardly extending hollow stub section 184 and the lower section 170 has an upwardly extending hollow stub section 186 which sealingly couples with the stub section 184. When coupled, the stub sections 184 and 186 define a through hole 188 therein for receiving the connector pipe 161.

In a preferred embodiment as best seen in FIG. 9, the internal upper walls 178 may be provided with shelves 190 at two opposing walls thereof. A pair of bearing housings 192 are mounted on the shelves 190 for rotatably supporting the rotary filter element 156. The rotary filter element 156 has a construction similar to that of the exemplary preferred embodiment which is described above with reference to FIG. 7.

In the illustrated embodiment as shown in FIG. 8, the spray bar 162 is positioned over the rotary filter element 156 so that water sprayed from the spray bar 162 falls only over one side of the rotary filter element 156. It is appreciated that a portion of the sprayed water absorbed by the rotary filter element 156 adds weight primarily at that one side of the filter element 156. As a result, the sprayed water unbalances the filter wheel element 156, causing the filter element 156 to rotate. The sprayed water then returns to the body of water in which the filtration system 150 floats.

The filter wheel element 156 is positioned so that a portion of the porous media cylinder 157 is submerged directly in the water to be treated. As the filter element 156 rotates, the beneficial bacteria resident on the surfaces of the porous media cylinder 157 of the filter element 156 biologically treat the water in which the cylinder is partially submerged. In preferred embodiments of the present invention, the submersion depth of the filter wheel element 156 may be varied by changing the size of the float housing 152, the height of the shelves 190, or the height of the bearing housings 192 with respect to the shelves 190. The height of the bearing housings 192 may be changed by the use of spacers (not shown) between the bearing housings 192 and the shelves 190. As discussed above, the optimal submersion depth of the filter wheel element 156 would be determined for a given size of the filter wheel element 156 and a given flow rate of water flowing from the spray bar 162.

Figure 10:
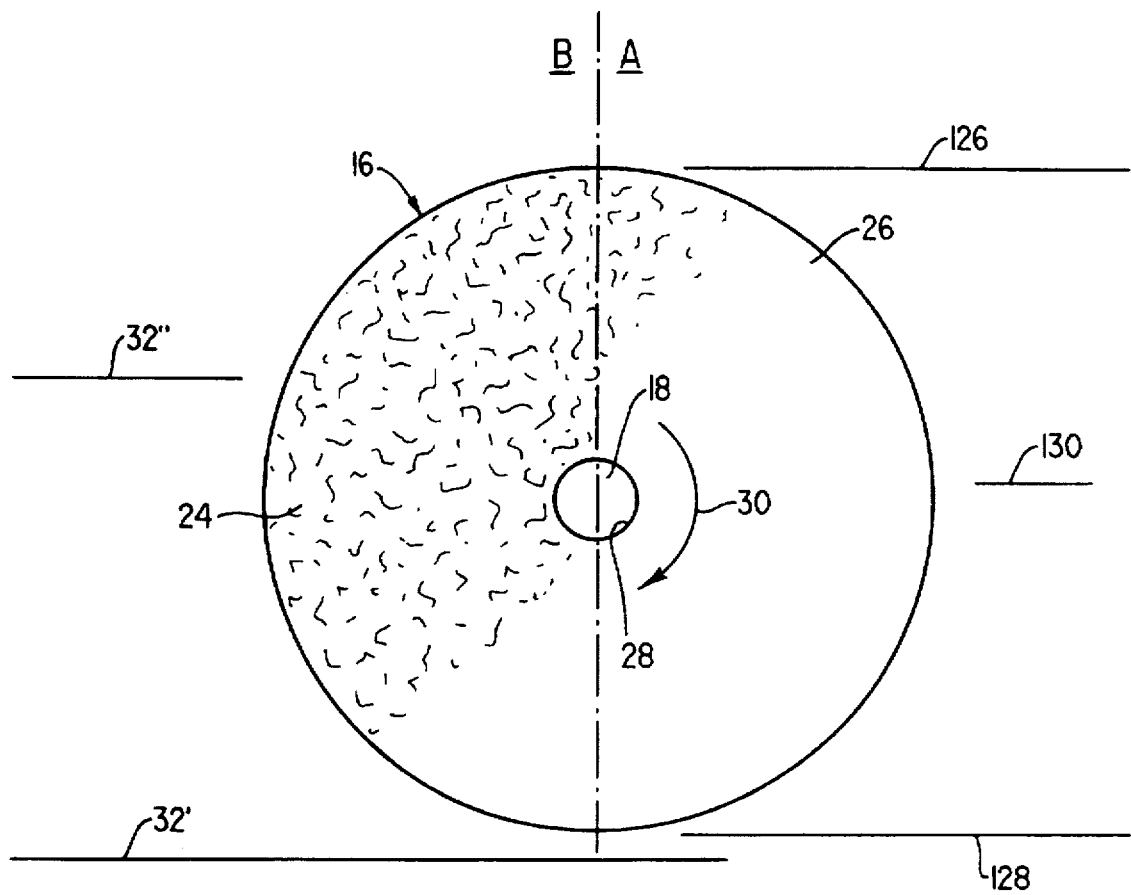
FIG. 10 is a view similar to that of FIG. 1, illustrating a range of installation possibilities, according to the invention, of a rotary filter element in an aquatic filter system.

In the embodiments described thus far, rotatably mounted filter element 16 is partly submerged in a body of water, shown at 20 in FIG. 1. However, embodiments of filter systems according to the invention can be constructed so that rotatably mounted filter element 16 is submerged to a greater or lesser extent than shown in FIG. 1, or is disposed entirely above, i.e. out of contact with, the underlying body of water. For example, as shown in FIG. 10, rotatably mounted filter element 16 may be mounted on its pivot bearings so that the associated body of water (element 20 in FIG. 1) has its surface at any level between water level 32' and, for example, water level 32". As indicated earlier herein, it is presently considered preferable that the maximum submersion depth of filter element 16 in the body of water be 40% of the diameter of filter media cylinder 26. However, there can be circumstances in which filter media cylinder 26 will satisfactorily perform its biological filtration function even when immersed in a body of water to a depth greater than 50% of the diameter of cylinder 26. The depth of immersion of cylinder 26 determines the relation between the percentage of time during which each portion of cylinder 26 is exposed to water and the percentage of time during which the portion is exposed to the atmosphere. The relation for achieving optimum biological filtration results can vary for different porous body material compositions and porosities.

In addition, the extent to which body 16 is submerged in water will influence the degree to which the body of water opposes rotation of filter element 16. Even if the outer surface of cylinder 26 is essentially smooth, i.e. circularly cylindrical, the viscosity of water and its adhesion to the sponge-like material of cylinder 26 will produce some resistance to rotation. Thus, the depth of partial submersion of cylinder 26 in the body of water, in conjunction with the rate of delivery of water to cylinder 26 to produce rotation can be selected to cause body 16 to rotate at an optimum rate.

In further accordance with the invention, the location, or region, of the circumference of cylinder 26 to which a flow, stream, or spray of water is delivered in order to produce rotation of element 16 can be in any region between the highest point and the lowest point of the circumference of cylinder 26. For a given rate of delivery of water to cylinder 26, the resulting rate of rotation of filter body 16 will increase as the location on the cylinder circumference at which water is supplied is moved upwardly toward the highest point of that circumference. Thus, as shown in FIG. 10, water can be supplied to side A in any region between the level 126 of the highest point of the circumference of cylinder 26 and level 128 of the lowest point of the circumference of cylinder 26. As a practical matter, water should be delivered at a location no lower than level 130, which is approximately 50% of the diameter of cylinder 26 above lowest level 128; i.e. level 130 is at the same height as the axis of rotation of element 16. Of course, the level at which water is delivered to side A of cylinder 26 must be above the level of the water in which cylinder 26 is partly submerged. Thus, for a given partial submersion depth of cylinder 26 in water, the rate of rotation of filter element 16 can be controlled by proper selection of the rate of delivery of water and the location at which the water is delivered between levels 126 and 128. Thus, selection of the rate of delivery of water and the location at which it is delivered to the circumference of cylinder 26 permits precise control of the rate of rotation of filter element 16 to be achieved.

While, in the embodiment disclosed above, water is delivered to the circumference of cylinder 26 from a spray bar, other devices can be employed for this purpose. For example, water can be delivered from a channel or conduit having any cross section and the direction of flow of water being delivered to the circumference of cylinder 26 can have any orientation since rotation is produced by absorption of the water by cylinder 26 and any impulse force provided by water striking cylinder 26 will have little or no effect on the rate of rotation.

In more general terms, water can be delivered from any source, including, but not limited to, nozzles, pipes, spillways, receptacles above the rotatable filter elements, etc.

Figure 11:
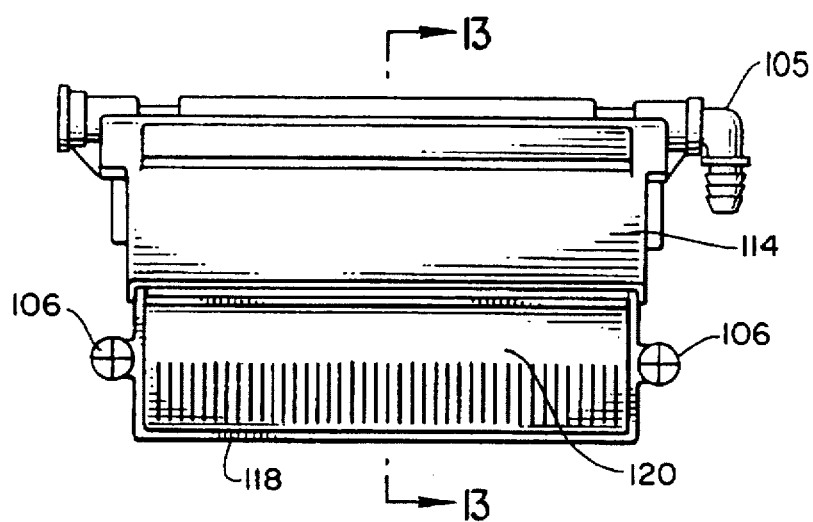
FIG. 11 shows a front view of yet another embodiment of a rotatary biological filter system according to the invention.
Figure 12:
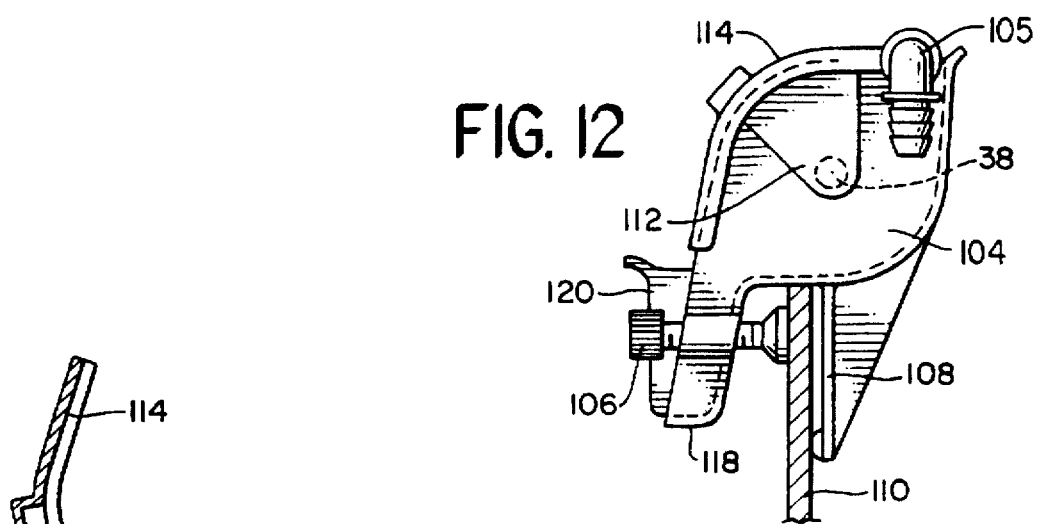
FIG. 12 shows a side view of the embodiment of FIG. 11.
Figure 13:
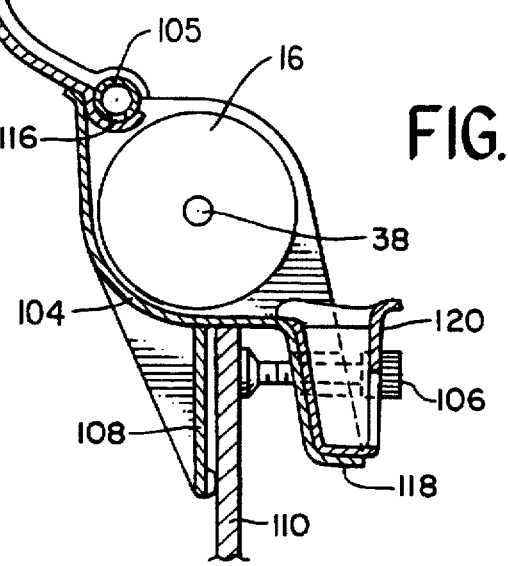
FIG. 13 shows a cross sectional view (with the cover raised) taken along line 13—13 in FIG. 11.

The embodiment illustrated in FIGS. 11–13 is for use in an aquarium and employs a filter body 16 of the type shown in FIGS. 1 and 10 rotatably mounted within a housing 104. Apart from filter body 16, the embodiment illustrated in FIGS. 11–13 is identical to that shown in FIGS. 18–20 of parent application Ser. No. 08/004,677. A pump or similar aquarium device (not shown), pumps water from the aquarium and into a spray bar 105 where the water is directed onto the filter body 16. The water from spray bar 105 impinging on filter body 16 causes filter body 16 to rotate. As filter body 16 rotates, successive portions thereof absorb water sprayed from spray bar 105, and are thus exposed to water, and then as the water drains from each portion it is exposed to the atmosphere. In this manner, the growth of aerobic bacteria on surfaces of the filter media, including surfaces within filter body 16, is facilitated.

As illustrated in FIGS. 12 and 13, housing 104 is mounted by means of screws 106 and brackets 108 to the upper edge of an aquarium frame 110 above the level of water within the aquarium. The ends of the filter body shaft 38 are rotatably received within recesses 112 formed at each end of housing 104. Housing 104 is provided with a cover 114 which allows for ready maintenance and removal of filter body 16. Preferably, housing 104 and cover 114 are both made of a tinted or opaque material, such as plastic, to foster the growth of aerobic bacteria. In the illustrated embodiment, cover 114 (which is shown in the open position in FIG. 13) is hinged about spray bar 105, which is positioned at the top of the housing 104. Spray bar 105 is provided with orifices 116 along one side.

In operation, with cover 114 closed as shown in FIG. 12, water is pumped from the aquarium to spray bar 105 where it exits, under pressure, through orifices 116. The exiting stream of water impinges on filter body 16 and is absorbed by filter body 104 to increase its effective weight on one side of a vertical plane passing through its axis of rotation and cause it to rotate. The speed of rotation is controlled by the flow rate of water from orifices 116 and the elevation of the portion of filter body 16 on which the water spray impinges, the influence of these parameters having been discussed above with reference to FIG. 10.

In many cases it is desirable to adjust the spray bar such that the speed of the rotating filter body 16 is sufficient to throw some of the water from filter body 16 to housing 104 and housing cover 114. This forms a thin film of water on the inside surface of housing 104 and greatly enhances aeration of the water.

The water supplied to filter body 16 drains from filter body 16, runs down the surface of housing 104, or otherwise exits housing 104 via an exit lip 118. From exit lip 118, the filtered water falls back into the aquarium. As illustrated in FIGS. 12 and 13, it may be desirable in some cases to provide a filtration basket 120 filled with chemical filtration media, such as activated carbon, on exit lip 118. In this manner, the water is chemically filtered as it exits housing 104. It may also be desirable to use a power head or pump from an undergravel or canister filter system to deliver water to spray bar 105. This allows for the efficient integration of the present biological filter element into a comprehensive mechanical, biological, and chemical filtration system. Depending on the size of the aquarium it may also be desirable to use more than one biological filtration element. To facilitate this, the embodiment of FIGS. 11-13 can be quickly and easily connected for ganged operation of multiple units using a single pump.

While the invention has been described with respect to the illustrated embodiments in accordance therewith, it will be apparent to those skilled in the art that various modifications and improvements may be made without departing from the scope and spirit of the invention. For example, two filter wheel elements or more may be arranged in the biological filtering system in accordance with one embodiment of the present invention. Also, the axis of rotation of the rotating filter element need not pass through a unitary absorptive body of material. Instead, the filter element may include a plurality of absorptive masses of reticulated material housed in compartments of the filter element. Other embodiments are also possible, their specific designs depending upon the particular application. As such, the scope of the- invention should not be limited by the particular embodiments herein described but should be defined only by the appended claims and equivalents thereof.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A biological filter for treating water in an aquatic system, comprising:
   a porous water absorbing body of material adapted for rotation; and
   means for supplying water to the body to be absorbed by a portion of the body so as to cause the body to rotate, said water absorbing body being constructed and positioned relative to said means for supplying water in a manner to be rotated substantially only by the weight of water absorbed in said body.

2. The filter of claim 1 wherein the body is a unitary mass of reticulated, cellular foam and the axis of rotation passes through the body.

3. The filter of claim 1 wherein the body is a mass of interconnected fibers and the axis of rotation passes through the body.

4. The filter of claim 1 further comprising a float for rotatably supporting the body partially submerged in the water to be treated.

5. A biological filter assembly comprising:
   a generally cylindrical body comprising a porous water absorbing mass of material;
   means for rotatably supporting said cylindrical body about an axis of rotation;
   water supply means for providing a flow of water onto said cylindrical body to be absorbed by said cylindrical body wherein the weight of said absorbed water unbalances said cylindrical body about said axis of rotation to thereby impart rotational movement to said cylindrical body to expose at least a portion of said cylindrical body alternately to water and the atmosphere; and
   control means for controlling the rotational speed of said cylindrical body.

6. A filter assembly according to claim 5, wherein a portion of said cylindrical body is adapted to be submerged in water to a submersion depth and said control means regulates the submersion depth of said cylindrical body.

7. A filter assembly according to claim 5, wherein said control means directs the flow of water onto the cylindrical body relative to the axis of rotation of the cylindrical body.

8. A filter assembly according to claim 5, wherein said water absorptive mass comprises a reticulated material to increase the surface area available for bacteria growth.

9. A filter assembly according to claim 6, wherein said control means comprises a container for receiving said cylindrical body and containing the water in which the portion of said cylindrical body is submerged, said container having a weir device over which water flows out of said container wherein the height of the weir device defines the level of water in said container.

10. A filter assembly according to claim 5, wherein said control means includes a flow rate control device for regulating the rate of said flow of water.

11. A filter assembly according to claim 9, wherein the control means has means for adjusting the height of said weir device to regulate the level of water in said container.

12. A filter assembly according to claim 5, wherein said supporting means comprises a float housing adapted to float on water and defining therein an opening for receiving said cylindrical body, said control means comprising submersion adjusting means provided at said float housing for adjusting the portion of said cylindrical body which is submerged in the water upon which the housing is floating.

13. A filter assembly according to claim 12, wherein said float housing has at least a bottom wall defining an opening for receiving said cylindrical body therein, and wherein said submersion adjusting means is adapted to adjust the level of said axis of rotation of said cylindrical body with respect to said bottom wall.

14. A filter assembly according to claim 5, wherein said cylindrical body has a predetermined diameter wherein the depth of said submerged portion is approximately 20% to 40% of the diameter of said cylindrical body.

15. A filter assembly according to claim 14, wherein the depth of said submerged portion is approximately 30% to 40% of the diameter of said cylindrical body.

16. A filter assembly according to claim 5, wherein said control means controls the rotational speed of said cylindrical body to be approximately 0.5 to 10 RPM.

17. A filter assembly according to claim 5, wherein said control means controls the rotational speed of said cylindrical body to be approximately 1 to 5 RPM.

18. A filter assembly according to claim 8, wherein said reticulated material is a reticulated ether-based polyurethane foam having a porosity of 10–60 pores per inch.

19. A filter assembly according to claim 5, wherein said reticulated material includes reticulated fibers and a resin at least partially bridging said reticulated fibers to define pores in said reticulated fibers.

20. A filter assembly according to claim 19, wherein said reticulated, fibrous material is "Aquacell Plus" made by Hobbs Industries.

21. A filter assembly according to claim 5, wherein said water supply means comprises a pre-filtering element for filtering water before the water is provided to the rotating body.

22. The filter of claim 1 further comprising means supporting the porous water absorbing body for rotation about a substantially horizontal axis, and wherein said porous water absorbing body extends vertically between an upper extremity and a lower extremity, and said water supply means are disposed for directing water onto the body at a location between the upper extremity and the lower extremity.

23. A filter assembly according to claim 5 wherein:
the axis of rotation of said cylindrical body is substantially horizontal;
said cylindrical body extends vertically between an upper extremity and a lower extremity of said body; and
said water supply means deliver water onto said cylindrical body at a location between said upper extremity and said lower extremity.

24. A filter assembly according to claim 5 wherein said body has an outer surface in the form of a circular cylinder.

* * * * *